L. C. JACKSON.
MEANS FOR CONTROLLING AND REGULATING THE OPERATION OF GAS ENGINES.
APPLICATION FILED FEB. 3, 1905.

1,010,369.

Patented Nov. 28, 1911.

L. C. JACKSON.
MEANS FOR CONTROLLING AND REGULATING THE OPERATION OF GAS ENGINES.
APPLICATION FILED FEB. 3, 1905.

1,010,369.

Patented Nov. 28, 1911.

WITNESSES:

INVENTOR

L. C. JACKSON.
MEANS FOR CONTROLLING AND REGULATING THE OPERATION OF GAS ENGINES.
APPLICATION FILED FEB. 3, 1905.

1,010,369.

Patented Nov. 28, 1911.

UNITED STATES PATENT OFFICE.

LUCIAN C. JACKSON, OF BUFFALO, NEW YORK.

MEANS FOR CONTROLLING AND REGULATING THE OPERATION OF GAS-ENGINES.

1,010,369. Specification of Letters Patent. Patented Nov. 28, 1911.

Application filed February 3, 1905. Serial No. 244,024.

*To all whom it may concern:*

Be it known that I, LUCIAN C. JACKSON, a citizen of the United States, residing at Buffalo, in the county of Erie and the State of New York, have invented or discovered a certain new and useful Improvement in Means for Controlling and Regulating the Operation of Gas-Engines, of which the following is a specification.

The object of my invention is to provide improved means for controlling and regulating the operation of gas engines; to provide improved features of construction to render the same simple, efficient and certain in action; to prevent unsteadiness in action of throttling valve and governor, and to combine in a novel regulating apparatus for automatic engines the advantages obtained in the hit and miss type, whereby the charge of air and other gases is conveyed separately to a mixing chamber; and at the same time varying the capacity of, or entirely closing, the supply passages through which said air and other gases are supplied to the cylinder or cylinders of a gas engine, and whereby the quantity and relative proportions of the air and other gases may be varied and the mingling of the gases effected in the mixing chamber, all as hereinafter set forth.

In the accompanying drawings.

In the drawings of my improved apparatus, the casing 1 is provided with a bushing 2 which incloses the sleeves 3 and 4 which in turn inclose the valve 5. The casing 1 is provided at one end with an annular chamber 6 surrounding the bushing 2 and having an air supply port 7. At the opposite end of casing 1 is an annular chamber 8 surrounding the bushing 2 and having a port 9 by which the other gases are admitted. The bushing 2 is provided with large ports 10 opening into the annular chamber 6 which are adapted to register with ports 11 in sleeve 3, and which in turn register with ports 37 in valve 5. Ports 10, 11 and 37 are always open to freely admit air from the air supply port 7 to the chamber 12 of valve 5. In the same manner the opposite end of bushing 2 is provided with large ports 13 opening into the annular chamber 8 which are adapted to register with ports 14 in sleeve 4, and which in turn register with ports 38 in valve 5. Ports 13, 14 and 38 are always open to freely admit gas from the supply port 9 to the chamber 15 of valve 5.

Valve 5 is divided into two parts by the partition 30 and incloses air chamber 12 and chamber 15 for the other gases and which are kept entirely separate from each other until they reach the mixing chamber 22 or 23. Both ends of chambers 12 and 15 are closed making each one balanced and forming a perfectly balanced valve device of valve 5.

As shown, my improved valve apparatus contains a valve having two separate chambers with their port controlling sleeves, for separately throttling and controlling the air and other gases, but I do not limit myself to any number of chambers or controlling sleeves as one or more may be used.

The chamber 12 of valve 5 is provided with ports 16 which are adapted to register with ports 17 in sleeve 3 and which in turn register with ports 18 in bushing 2. The passages 19 and 20 lead from the annular chamber 21, shown in Figs. 3 and 6, to the mixing chambers 22 and 23. The chamber 15 of valve 5 is provided with ports 24 which are adapted to register with ports 25 in sleeve 4, and which in turn register with ports 26 in bushing 2. The passages 27 and 28 lead from the annular chamber 29, shown in Fig. 3, to the mixing chambers 22 and 23.

Figures 1, 2, 3, 4, 5, 6:
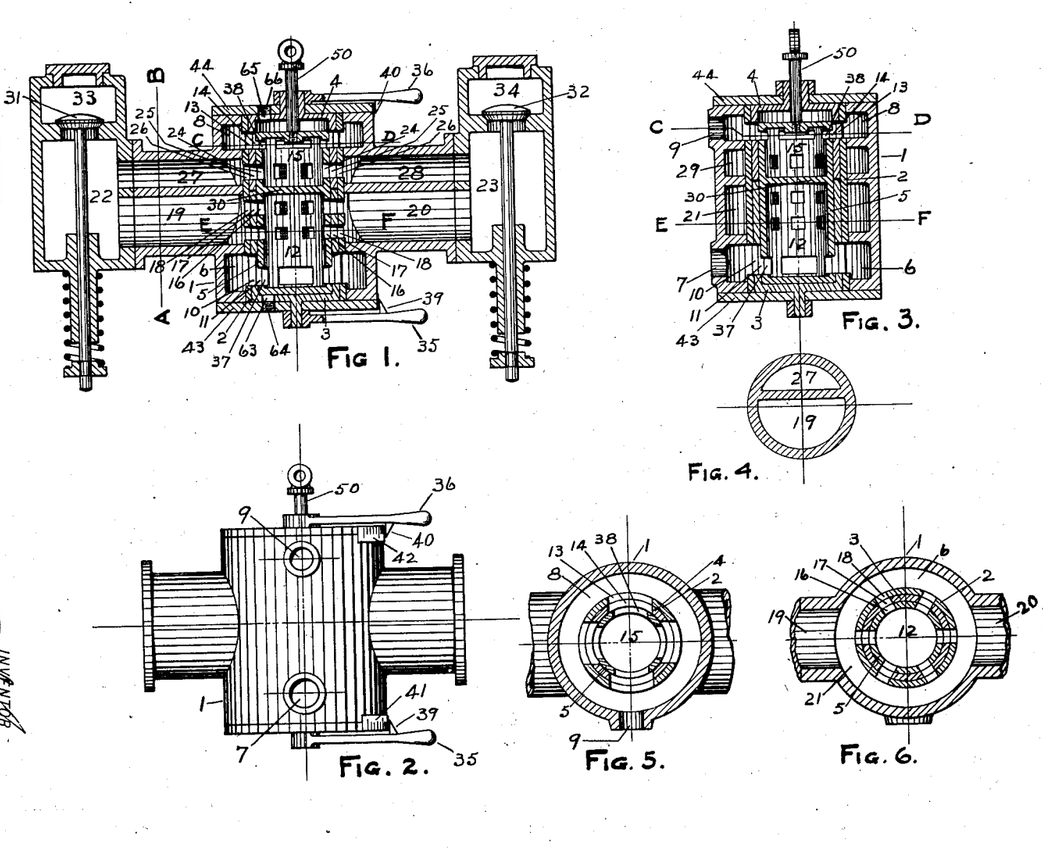
Figure 1, is a central longitudinal section through the axis of my improved apparatus and showing connection to two mixing chambers and puppet valves for controlling passages from said mixing chambers to two combustion chambers in a gas engine.
Fig. 2, a front elevation of the casing shown in section in Fig. 1.
Fig. 3, a central longitudinal section through the axis of my improved valve apparatus showing openings for admitting air and other gases to the casing.
Fig. 4, a transverse section on line A—B of Fig. 1, showing the connection between valve casing and mixing chamber divided in two parts.
Fig. 5, a transverse section on line C—D of Figs. 1 and 3.
Fig. 6, a transverse section on lines E—F of Figs. 1 and 3.

The air admitted into the chamber 12 from the annular chamber 6 and supply port 7 passes through the ports 16, 17 and 18 of the valve 5, sleeve 3 and bushing 2 to the annular chamber 21 shown in Figs. 3 and 6. The gas admitted into the chamber 15 from the annular chamber 8 and supply port 9 passes through the ports 24, 25 and 26 of the valve 5, sleeve 4 and bushing 2 to the annular chamber 29 shown in Fig. 3.

When valve 31 is opened, the air from annular chamber 21 and gas from annular chamber 29 are sucked through passages 19 and 27 to the mixing chamber 22 where they mingle and are then drawn into a cylinder or combustion chamber of the engine, not shown, through the passage 33. In the same way when valve 32 is opened, the air and gas from annular chambers 21 and 29 are sucked through passages 20 and 28 to the mixing chamber 23, where they mingle and are then drawn into another cylinder or combustion chamber of the engine through the passage 34.

My invention is shown communicating with two cylinders or combustion chambers of an engine but it is not limited to any number as it is adapted to supply one or more.

The bushing 2 is fitted tightly in casing 1 while sleeves 3 and 4 are provided with handles 35 and 36, by which they may be moved by hand and in either direction to effect any desired opening of the ports 16 and 24, or to entirely close them. The fit of the sleeves 3 and 4 in the casing 2 is preferably of such a character that they may be easily moved by hand but sufficiently snug to hold them in any position in which they may be placed, though any convenient locking device may be used. Valve 5 is closely fitting but freely moving in the sleeves 3 and 4.

For convenience in manufacturing I have shown the bushing 2 in casing 1 but it is not essential to my invention as the casing 1 can be cast in one piece with 2. The ports in casing 2 registering with ports in sleeves 3 and 4 may be made much larger than shown if desired as the movement of the sleeves 3 and 4 will still vary the openings of the ports 16, 17, 24 and 25. The handles 35 and 36 are provided with pointers 39 and 40 to indicate on the graduated scales 41 and 42, to what extent the ports 16, 17, 24 and 25 are open.

In Figs. 1 and 3, the outer ends of the sleeves 3 and 4 are shown in contact with ends 43 and 44 of the casing 1, and their inner ends in contact with each other. Sleeve 3 is then adapted to be rotated by the handle 35 to effect any desired opening of the ports 16, and 17, but should not materially affect the size of the openings through the large ports 10, 11 and 37, through which air is admitted to the chamber 12 of the valve 5. In the same manner sleeve 4 is adapted to be rotated by the handle 36 to effect any desired opening of the ports 24 and 25, but should not materially affect the size of the openings through the large ports 13, 14 and 38, through which the other gases are admitted to the chamber 15 of the valve 5. It is obvious that other means may be employed to operate the sleeves 3 and 4 without departing from the spirit of my invention.

Figure 13:
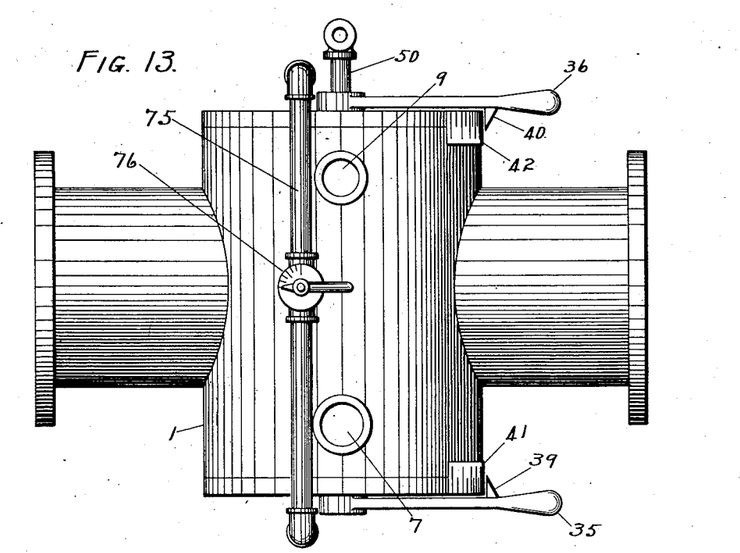
Fig. 13 a front elevation, and Fig. 14, a side elevation, partly in section through openings 63, and 65, of Fig. 1, of my improved valve apparatus, showing a pipe and valve for controlling any unsteady movement of the valve.
Figure 14:
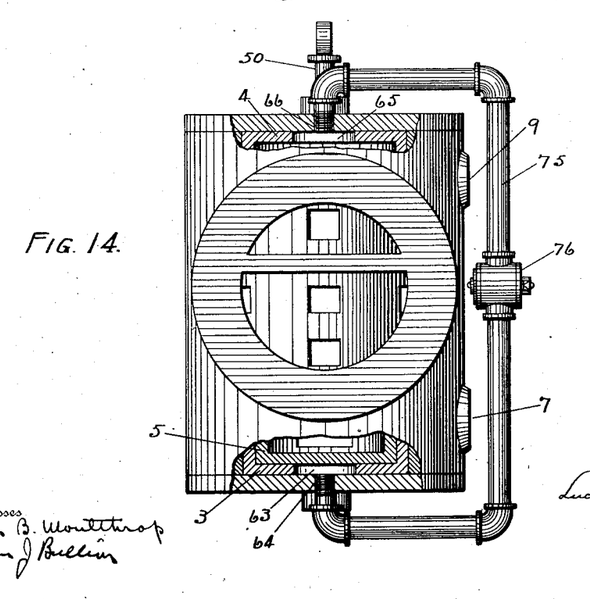

In Fig. 1, holes 64 and 66 are tapped through ends 43 and 44 of casing 1, and communicating into openings 63 and 65 of sleeves 3 and 4. The openings 63 and 65 (see Fig. 14) are elongated and of such a shape as to be always in communication with 64 and 66. These holes 64 and 66 are then connected together by means of pipe, 75, Figs. 13 and 14. This allows the air over one end of valve 5 to pass to the other end as the valve is moved up or down and so prevent a vacuum being formed between the ends of valve 5 and sleeve 3 or 4. An ordinary index valve 76 is inserted in the pipe 75 between holes 64 and 66. The amount of opening through this valve 76 in the pipe 75 can be regulated and so act as a dash pot to steady the movement of valve 5 from one position to another. Under the influence of the governor while "hunting", caused by improper setting of throttling valve, improper design or construction of throttling valve or governor; or by sudden changes of load, the throttling valve and governor have an unsteady and jumping motion which this arrangement prevents. The valve 5 is so connected to a governing device that it may be moved longitudinally to vary the capacity of the ports 16, 17, 24 and 25 but my invention is not limited to any specific governing device or connections thereto.

Figure 9:
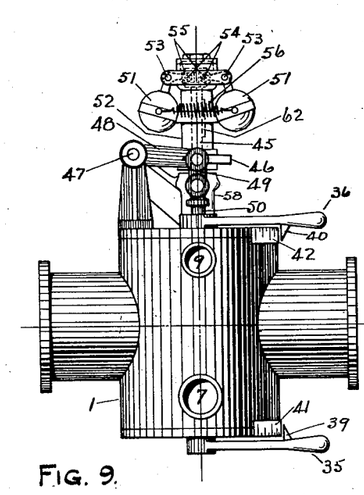
Figs. 9 and 10, a front and side elevation of my improved valve apparatus shown in combination with an automatic governing device.
Figure 10:
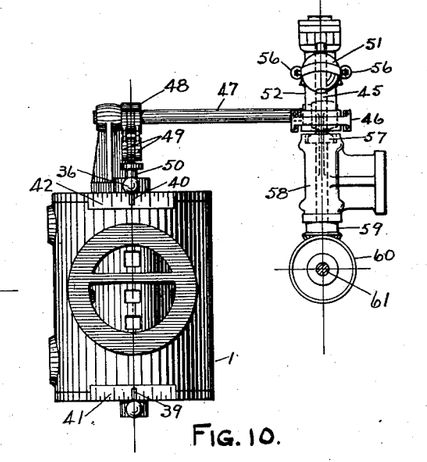

In Figs. 9 and 10, a centrifugal flyball governor is shown mounted on a shaft 45, and rotating with it, and being connected to the valve 5 by means of a yoke 46, shaft 47, lever 48, links 49 and rod 50. The balls or weights 51, are pivoted to the governor body 52, by the pins 53, and connected to the shaft 45, by means of pins 54 and sliding blocks 55, and held against the action of centrifugal force by the springs 56. The shaft 45 has a flange 57 for supporting it in the base 58, and is rotated by the gears 59 and 60 and shaft 61, which is operated from the motor. Shaft 45 is held from endwise movement by the flange 57 and gear 59, and in rotating drives the governor body 52, by means of the feather 62, which allows the governor to rise and fall and so impart through its connections a longitudinal movement to the valve 5 for varying the openings through the ports 16, 17, 18, 24, 25 and 26. The quality of the mixture of air and other gases in the mixing chambers 22 and 23, is regulated by adjusting the sleeves 3 and 4 by means of the handles 35 and 36. This is accomplished by giving the sleeves 3 and 4 a partial rotation by hand which adjusts the relative sizes of the openings through them and so secures any desired proportion between the air and other gases passing from the chambers 12 and 15 of the valve 5, to the chambers 22 and 23, where they are mixed and then admitted to the cylinders or combustion chambers of the engine. The valve 5 which is connected to and controlled by an automatic governor, has a longitudinal movement for securing any desired quantity of the air and other gases admitted to the mixing chambers, and this is accomplished without varying the proportions and hence the quality determined by the position of the sleeves 3 and 4. The valve 5 has only a longitudinal movement and by means of the automatic governor regulates the amount of air and other gases required in accordance with the speed of the motor; but the proportions of air and other gases may be varied at any time and independent of the operations of the governor, without disturbing it in any way, by the movement of the sleeves 3 and 4.

My improved valve device is not a mixing but a throttling valve apparatus and the air and other gases passing through it are throttled and conducted separately to a mixing chamber where they partially mingle before entering the combustion chamber or cylinder of the engine. This is an important feature of my invention and prevents back firing or premature ignition of the charge while being drawn into the engine cylinder and coming in contact with the flame from the previous charge as frequently happens. The mixing chamber is of such a size as to allow the air and other gases to commence to mingle so they will only be properly mixed when compressed in the engine cylinder and ready to be fired. When the gas and air are thoroughly mixed in a valve or chamber some distance from the engine cylinder and then come in contact with the flame from a previous charge while being drawn into it, the entire mixture is ignited and causes a loud explosion back through the air-pipe into the engine room. Air and gas are not explosive unless mixed in the proper proportions and by keeping them separate and not allowing them to be thoroughly mixed before entering the combustion chamber of an engine, as with my improvement, any flame remaining from a previous charge will be extinguished.

In Figs. 7, 8, 11 and 12 I have shown my improved valve apparatus with the valve 5 adapted to be rotated by means of a governor and longitudinal movements of the valve inclosing sleeves effected by the hand operated devices, as my improvement is not limited to a construction in which the valve is connected to a governor for a longitudinal movement only, and in which the hand operated devices have only a rotary movement.

Figure 7:
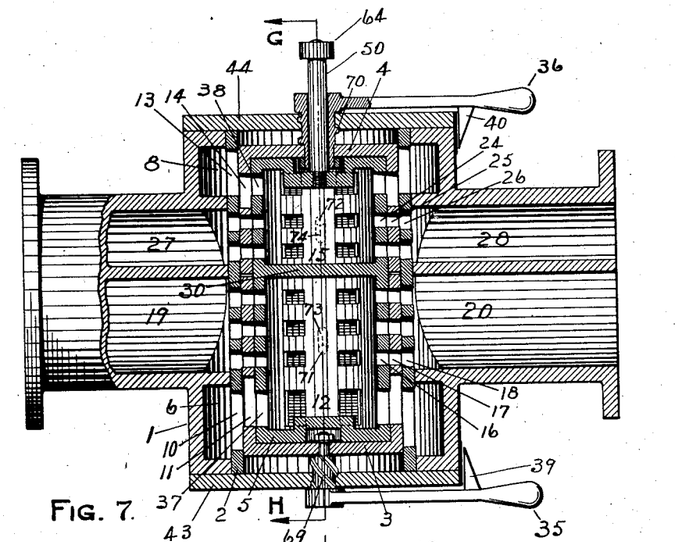
Fig. 7, a central longitudinal section through the axis of a modification of the valve apparatus in which rotary movement of the valve is effected by the governor and longitudinal movement of the sleeves inclosing the valve is effected by the hand operated devices.
Figure 8:
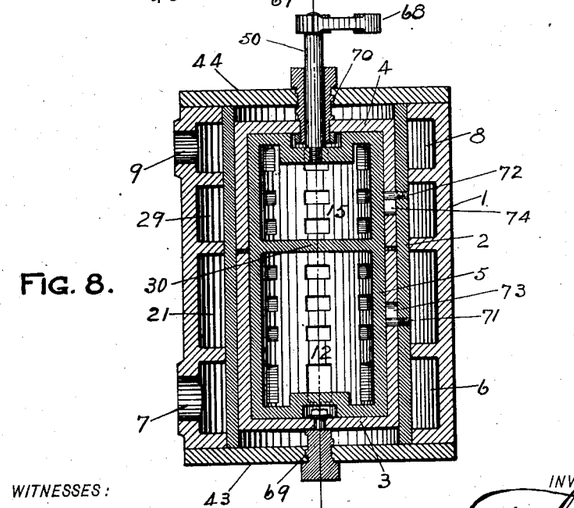
Fig. 8, a central longitudinal section on the center line or axis G—H of Fig. 7, showing openings for admitting air and other gases to the casing.
Figure 11:
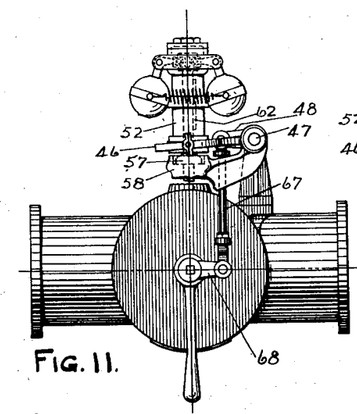
Figs. 11 and 12, a front and side elevation of a modification of the valve apparatus in combination with an automatic governing device for effecting a rotary movement of the valve, and hand operated devices for effecting the longitudinal movements of the valve inclosing sleeves.
Figure 12:
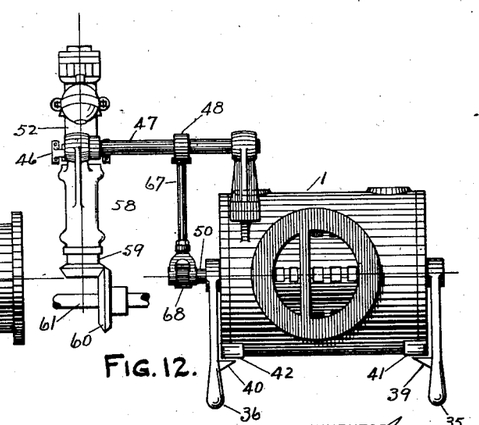

In Figs. 11 and 12 the flyball governor is shown connected to the valve 5 of Figs. 7 and 8, by means of a yoke 46, shaft 47, lever 48, link 67, arm 68, and rod 50, so as to effect a rotary movement of valve 5. In Figs. 7 and 8, the handles 35 and 36 are threaded through the ends 43 and 44 of casing 1, with the coarse pitch threads 69 and 70, so as to effect a longitudinal movement of sleeves 3 and 4. Pins 71 and 72 are fastened into bushing 2 and permit only longitudinal movement of sleeves 3 and 4 by means of the slots 73 and 74. With the construction shown in Figs. 7, 8, 11 and 12 it will be seen that the valve 5 is rotated by means of the governor to effect variations in the amount of air and gas admitted to the cylinder or cylinders of an engine, while the hand operated devices longitudinally move the sleeves 3 and 4 to effect the proportions of air and gas.

The important features in my improved device are the preventing of too sudden changes in the movement of the throttling valve, whereby a steady action of the same is obtained; the relative or proportional variation of the port openings by the valve under action of the governor and independent of the hand operated sleeves for varying the proportions of air and gas, whereby for all adjustments of the hand operated devices the same degree of opening or closing of the air and gas ports is effected; and the separate regulating of the air and gas and carrying same close to combustion chamber before allowing to commence to mix, whereby the advantages of a hit and miss engine are combined in a throttling engine.

I claim as my invention and desire to secure by Letters Patent—

1. The combination, of a casing having an air supply passage and a gas supply passage, air and gas admission ports communicating with said passages, a valve which is independent of the main admission valve having separate chambers receiving air and gas from said ports, means independent of a governor for controlling the movement of said valve and a governing device for operating the valve which is adapted to automatically vary the flow of air and gas from said valve to a mixing chamber or chambers, substantially as set forth.

2. The combination, of a casing having separate air and gas delivery passages to a mixing chamber or chambers, ports communicating with said delivery passages, a valve which is independent of the main admission valve having separate chambers from which it delivers air and gas to said passages, means independent of a governor for controlling the movement of said valve and the governing device for operating the valve which is adapted to automatically vary the capacity of the delivery ports, substantially as set forth.

3. In a regulating device, for controlling the supply of air and other gases to a gas engine, the combination, of a casing having separate air and gas delivery passages, a valve device, consisting of a valve having separate chambers for the air and other gases and two independent and hand operated valve inclosing sleeves, one of which is adapted to vary the outlet ports from one chamber of said valve and the other adapted to vary the outlet ports from the other chamber of said valve, substantially as set forth.

4. In a regulating device, for controlling the supply of air and other gases to a gas engine, the combination, of a casing having separate air and gas delivery passages, a valve device, controlling the said delivery passages, said valve device consisting of a valve adapted to be adjusted in one direction to vary the quantity of air and other gases, from said valve to a mixing chamber or chambers, and separate hand operated sleeves for the air and other gases adapted to be adjusted in another direction to vary the proportions of the air and other gases, substantially as set forth.

5. In a regulating valve device, for controlling the supply of air and other gases to a gas engine, the combination, of a cylindrical casing having air and gas supply passages and air and gas delivery passages, a cylindrical valve having two separate chambers and two cylindrical valve inclosing and hand operated sleeves, located and movable within said casing, both of said sleeves adapted to be adjusted rotatively to vary the proportions of the air and other gases, and the said valve adapted to be adjusted longitudinally to vary the quantity of the air and other gases from said valve to a mixing chamber, substantially as set forth.

6. In a regulating valve device, for controlling the supply of air and other gases to a gas engine, the combination, of a hollow cylindrical casing having separate air and gas supply passages and separate air and gas delivery passages, a hollow cylindrical valve and two hollow cylindrical hand operated sleeves, the said valve controlling the quantity of air and other gases, and the said sleeves controlling the proportions of air and other gases flowing from said valve to a mixing chamber; said valve and sleeves being adapted to be adjusted to vary the capacity of the air and gas ports, substantially as set forth.

7. A valve device, formed of a hollow cylindrical valve having two chambers and two hollow cylindrical valve inclosing sleeves, ports in said sleeves controlled by movement of said valve in one direction and ports in said valve controlled by movement of said sleeves in another direction, passages through which the separately regulated air and gas may pass from said valve to a mixing chamber or combustion chamber of a gas engine, an automatic governor connected to the valve for controlling the quantity of air and gas admitted to the combustion chamber, and means whereby either or both sleeves may be adjusted by hand to vary the proportions of the air and gas, substantially as set forth.

8. In a regulating device, for separately controlling the supply of air and other gases to a gas engine, the combination, of a casing having separate air and gas delivery passages, a valve device, controlling the said delivery passages, said valve device consisting of a valve adapted to be adjusted longitudinally to vary the quantity of air and other gases from said valve to a mixing chamber or chambers, and separate hand operated sleeves for the air and other gases adapted to be adjusted rotatively, to vary the proportions of the air and other gases, substantially as set forth.

9. In a regulating device, for separately controlling the supply of air and other gases to a gas engine, the combination, of a casing having separate air and gas delivery passages, a valve device, controlling the said delivery passages, one part of said valve device adapted to be adjusted in one direction to vary the quantity of air and other gases without varying their proportions, and another part adapted to be adjusted in another direction to vary the proportions of the air and other gases, substantially as set forth.

10. In a regulating valve device, the combination, with a cylindrical longitudinally-adjustable valve, said valve having separate chambers for the air and other gases, of cylindrical, rotatively-adjustable sleeves, and an arm connected to each sleeve, whereby movement of said arms may cause rotative movement of said sleeves, substantially as set forth.

11. In a regulating valve device, for gas engines, the combination of a valve having separate ports for air and other gases passing through it to a mixing chamber, separate sleeves inclosing said valve for regulating the air and other gases passing separately through said valve, means for moving said valve in one direction, and mechanism connected to each of the sleeves, whereby either may be moved in another direction independently of the other, substantially as set forth.

12. As a means for controlling the movement of a regulating valve independent of the governor, the casing provided with end ports or passages, in combination with an external passage connecting with said ports, and with means for varying the capacity of said external passage, substantially as set forth.

13. The combination, of a casing having an air supply passage and a gas supply passage, air and gas admission ports communicating with said passages, separate air and gas delivery passages to a mixing chamber or chambers, ports communicating with said delivery passages, and a valve, independent of the admission valve of the engine, inclosed by two hand operated sleeves and having separate chambers from which it delivers air and gas to said delivery passages and thence to a mixing chamber and automatically varies the capacity of the delivery ports, substantially as set forth.

14. In a regulating device for controlling the supply of air and other gases to a gas engine, the combination with a casing, having ports, and a two-part rotatable inner sleeve with ports designed to register with the casing ports, of an inner two-chambered adjustable valve having ports designed to register with companion ports in the sleeve and casing, and controlled by a governor designed to move said valve longitudinally within the sleeve and thereby varying the size of the ports, whereby the quantity of the air and gas may be varied, and conducted separately from said regulating device, without varying the proportions thereof, substantially as set forth.

15. In a regulating device for controlling the supply of air and other gases to a gas engine, the combination, of a casing having separate air and gas delivery passages from a throttling valve to a mixing chamber or chambers, a valve device, said valve device consisting of a valve adapted to be adjusted in one direction by means of a governor to vary the quantity of air and other gases separately, and separate hand operated members for the air and other gases adapted to be adjusted in another direction to vary the proportions of the air and other gases, substantially as set forth.

16. A regulating device for controlling the supply of air and other gases to a gas engine, which comprises a cylindrical casing, a valve located and movable within the said casing and two hand operated sleeves inclosing said valve one of said sleeves controlling the proportion of air and the other of said sleeves controlling the proportion of other gases, and an automatic governor connected to said valve and adapted to vary the capacity of the air and gas ports without varying the proportions of the air and gas, and thereby to control the quantity of air and other gases from said valve to a mixing chamber, substantially as set forth.

17. A regulating device for controlling the supply of air and other gases to a gas engine, which comprises a casing, a balanced valve having two inclosed and separate chambers, one of which has admission and delivery ports for air and the other of which has admission and delivery ports for the other gases, and an automatic governor connected to said balanced valve and adapted to vary the capacity of the air and gas ports without varying the proportions of the air and gas, and thereby separately control the quantity of air and other gases from said balanced valve to a mixing chamber, and means independent of a governor for controlling the movement of said valve substantially as set forth.

18. The combination, in a regulating device for controlling the supply of air and other gases to a gas engine, of a casing, two separate sleeves and a valve, movable within the casing, one of said sleeves controlling the flow of air and the other of said sleeves controlling the flow of the other gases from said valve to a mixing chamber, an automatic governor connected to and adapted to operate said valve to control the quantity only of air and other gases from said valve to a mixing chamber, and means for adjusting each of said sleeves by hand to vary the proportions of the air and gas, substantially as set forth.

19. In a gas engine, in which the operation of the engine is regulated by varying the quantity of air and gas admitted to the cylinder, the combination, in a valve device which is independent of the admission valve of the engine, of a casing, separate ports for the admission of air and gas to the casing and separate ports for the delivery of the air and gas to said cylinder, two separate members located and movable within the casing, one controlling the flow of air and the other the flow of gas to said cylinder, a valve located and movable within said members, a governing device connected to and adapted to operate said valve to control the quantity only of air and gas from said valve to said cylinder, and means for separately adjusting each of the said members by hand to vary the proportions of the air and gas admitted to said cylinder, substantially as set forth.

20. In a gas engine, the combination of a valve which is independent of the main admission valve, two separate chambers therein, one for air and the other for the other gases, normally open ports through which air and gas may pass to a mixing chamber, means independent of a governor for controlling the movement of said valve and a governor for operating the valve to vary the capacity of the air and gas ports independently of the opening or closing of the main admission valve of the engine, and without varying the proportions of the air and gas, substantially as set forth.

21. In a regulating device, which is independent of the main admission valve, for controlling the supply of air and other gases to a gas engine, the combination, of a casing having air and gas supply passages and air and gas delivery passages, and a valve mechanism controlling said air and gas delivery passages to a mixing chamber, said valve mechanism having a hand operated portion adapted to be adjusted to regulate the proportions of the air and other gases, and said valve mechanism having a governor operated portion adapted to vary the quantity of air and other gases admitted to the engine without variation of the proportions, substantially as set forth.

22. In a gas engine, in which the operation of the engine is regulated by varying the quantity of air and other gases admitted to the cylinder, the combination, with means for separately conveying said air and other gases to said cylinder, of a valve device in which the air and other gases are separately regulated and separately conducted to said conveying means, means to operate said valve device to vary the proportions of said air and other gases and means to operate said valve device to separately vary the quantity of said air and other gases without varying their proportions, substantially as set forth.

23. In a gas engine, in which the operation of the engine is regulated by varying the quantity of air and other gases admitted to the cylinder and without varying the proportions, the combination with means for separately conveying said air and other gases to said cylinder, of a valve device in which the air and other gases are separately regulated and separately conducted to said conveying means, means to operate said valve device rotatively to vary the proportions of said air and other gases and means to operate said valve device axially to separately vary the quantity of said air and other gases, substantially as set forth.

24. In a gas engine having a combustion chamber, the combination, of a valve device having separate chambers through which the air and other gases are separately conducted and separately regulated, means to separately convey said air and other gases from said valve device to said combustion chamber, means to operate said valve device in an angular direction by hand to vary the proportions of said air and other gases, automatic means to operate said valve device in a longitudinal direction to vary the quantity of said air and other gases, substantially as set forth.

25. In a regulating device for controlling the supply of air and other gases to a gas engine, the combination, with a valve and a governor for operating the valve of means for controlling the rate of movement of said valve under the action of said governor, substantially as set forth.

26. In a regulating device for controlling the supply of air and other gases to a gas engine, the combination, of a casing inclosing a valve device, separate air and gas supply passages to said casing, separate air and gas delivery passages from said casing, said valve device adapted to be adjusted by hand to vary the proportions of the air and other gases and a governor connected to said valve device whereby the quantity of the air and other gases may be separately varied and separately conducted from said casing, substantially as set forth.

27. In a gas engine in which the operation of the engine, is regulated by varying the quantity of air and other gases admitted to the combustion chamber, the combination, of a valve device through which the air and other gases are separately conducted and separately regulated, means to adjust said valve device to vary the proportions of said air and other gases and automatic means to operate said valve device longitudinally whereby the quantity of said air and other gases is separately varied, without varying their proportions, substantially as set forth.

28. In a regulating device for controlling the supply of air and other gases to a gas engine, a casing having separate passages for separately conveying said air and other gases to said engine, a valve controlling the flow of air and other gases through said separate passages, and a sleeve having ports adapted to communicate with ports in said valve, said sleeve being movable, whereby the capacity of the ports in said valve may be varied.

29. In a regulating device for controlling the supply of air and other gases to a gas engine, the combination, with means for separately conveying said air and other gases, of a valve device through which the air and other gases are separately regulated and separately conducted to said conveying means, means to vary the proportions of said air and other gases and means to operate said valve device to vary the quantity of said air and other gases, substantially as set forth.

30. In a regulating device for controlling the supply of air and other gases to the combustion chamber of a gas engine, the combination with means for separately conveying said air and other gases to said combustion chamber, of a valve device through which the air and other gases are separately conducted and separately regulated, a regulatable sleeve adjustable in one direction to vary the proportions of the air and other gases so conveyed and a regulatable valve adjustable at right angles to said first mentioned direction to vary the quantity of the air and other gases so conveyed.

31. In a regulating device for gas engines, the combination, of a valve device having separate portions for controlling separate passages through which the air and other gases are separately conducted and governor means connected to and adapted to move said valve device longitudinally whereby the quantity of the air and other gases may be separately regulated, substantially as set forth.

32. In a regulating device for controlling the supply of air and other gases to a gas engine, the combination, of a valve device having different parts for separately controlling the air and other gases to said engine, one part adapted to control an air passage, another part adapted to control a gas passage, means to vary the proportions of the air and other gases and a governor connected to and adapted to operate said valve device in the direction of its axis and thereby separately vary the quantity of the air and other gases, substantially as set forth.

33. In a regulating device for controlling the supply of air and other gases to a gas engine, the combination with a valve, and a casing provided with separate passages leading to said engine for separately conveying air and other gases to said engine; of an adjustable sleeve having ports adapted to register with ports in said valve, said valve being movable for regulating the air and other gases flowing through said ports.

34. In a regulating device for controlling the supply of air and other gases to a gas engine, the combination with means having separate air and gas passages, of a valve device controlling said separate passages, means to vary the proportions of the air and other gases by hand, and means for moving said valve device longitudinally whereby the quantity of the air and other gases may be regulated and separately conducted from said regulating device.

35. In a reglating device for controlling the supply of air and other gases to a gas engine, the combination, of a valve device having different parts controlling separate passages through which air and other gases are conducted to a gas engine, said different parts being substantially balanced, and governor means for moving said valve device longitudinally to vary the quantity of the air and other gases.

36. In a regulating device for controlling the supply of air and other gases to a gas engine, the combination, of a balanced valve device having different parts controlling separate air and gas passages to said engine, means to vary the proportions of the air and other gases and automatic means for moving said valve device longitudinally to vary the quantity of the air and other gases.

37. A regulating device for controlling the supply of air and other gases to a gas engine which comprises a casing, a valve having separate chambers for the air and other gases, means to vary the proportions of the air and other gases and a governor connected to and adapted to operate said valve whereby the air and other gases are separately regulated and separately conducted to a mixing or combustion chamber, substantially as set forth.

38. In a regulating device for controlling the supply of air and other gases to a gas engine, the combination, of a casing inclosing a valve device, separate air and gas supply passages to said casing, separate air and gas delivery passages from said casing, means to vary the proportions of the air and other gases, said valve device adapted to be operated by a governor whereby the quantity of the air and other gases may be separately varied.

39. In a regulating device for controlling the supply of air and other gases to a gas engine, the combination, of a valve device through which the air and other gases are separately conducted and separately regulated, said valve device adapted to be moved longitudinally to vary the quantity of the air and other gases and means to vary the proportions of the air and other gases.

40. In a regulating device for controlling the supply of air and other gases to a gas engine, the combination, of a valve device through which the air and other gases are separately conducted and separately regulated, said valve device adapted to be adjusted in an angular direction to vary the proportions of the air and other gases and said valve device adapted to be adjusted in the direction of its axis to vary the quantity of the air and other gases, substantially as set forth.

41. In a regulating device for controlling the supply of air and other gases to a gas engine, the combination, of a valve device through which the air and other gases are separately conducted and regulated, a governor for moving said valve device and means for controlling the rate of movement of said valve device, substantially as set forth.

In testimony whereof I affix my signature in the presence of two witnesses.

LUCIAN C. JACKSON.

Witnesses:
HENRY G. STILWELL,
JOSEPH A. SCHOFIELD.

Copies of this patent may be obtained for five cents each, by addressing the "Commissioner of Patents, Washington, D. C."